United States Patent [19]

Lin

[11] 4,420,609

[45] Dec. 13, 1983

[54] CATALYST DEACTIVATION IN PROPYLENE POLYMERS USING AMMONIUM SALTS

[75] Inventor: Chi-Hung Lin, Wheaton, Ill.

[73] Assignee: Standard Oil Company (Indiana), Chicago, Ill.

[21] Appl. No.: 311,935

[22] Filed: Oct. 16, 1981

[51] Int. Cl.³ .............................................. C08F 6/02
[52] U.S. Cl. ................................... 528/486; 528/490; 528/502
[58] Field of Search ........................ 528/486, 492, 490

[56] References Cited

U.S. PATENT DOCUMENTS 3,269,997  8/1966  Lyons .................................. 528/492

Primary Examiner—C. A. Henderson
Attorney, Agent, or Firm—Wallace L. Oliver; William T. McClain; William H. Magidson

[57] ABSTRACT

Polyolefin polymer powder containing active catalyst residues is deactivated by contacting such powder with a mixture containing an inert gas and an ammonium salt in a dry state.

7 Claims, No Drawings

CATALYST DEACTIVATION IN PROPYLENE POLYMERS USING AMMONIUM SALTS

BACKGROUND OF THE INVENTION

This invention relates to olefin polymerization and more particularly relates to deactivation of catalyst residues contained in propylene polymers.

Crystalline propylene polymers and their methods of manufacture are well known in the art. Propylene polymers are produced commercially using a transition metal compound/aluminum alkyl catalyst system. However, in such propylene polymer production, catalyst residues must either be removed or deactivated prior to practical use in order to avoid polymer corrosivity in undeactivated or "live" polymer.

Live polymer deactivation especially is critical to polymer produced in bulk and gas-phase polymerization processes where catalyst residues typically are not removed from the polymer in contrast to polymer produced in a slurry process.

Many polymer deactivation methods have been disclosed including treatment with water, caustic, alcohols, oxygen and alkylene oxides.

Examples of such methods are found in U.S. Pat. Nos. 2,838,477, 2,918,461, 3,110,708, 3,436,386, 3,318,857, 3,496,156, 3,502,633, 3,377,332, 4,029,877, 4,156,075, 4,167,619, 4,182,852, 4,195,145 and 4,197,398; British Pat. Nos. 1,272,778 and 1,091,644; and Japanese Published Application Nos. 139,833/75 and 126,291/79. U.S. Pat. No. 3,435,019 describes the use of aqueous ammonia and amine compounds in an extruder to deactivate catalyst residues. Japanese Published Application No. 18,422/80 discloses adding ammonia to a polyolefin to deactivate catalyst residues. U.S. Pat. No. 2,921,057 discloses use of anhydrous ammonia and butanol for catalyst residue deactivation. British Pat. No. 1,420,837 describes a process to reduce halogen content in a polyolefin by reacting the polyolefin in a fluid bed with nitrogen, steam and an alkylene oxide. Although many deactivation methods have been disclosed, there is a need for an effective catalyst deactivation method which can be used in a dry environment, especially for use with polymer produced from gas-phase or bulk polymerization processes.

SUMMARY OF THE INVENTION

Polyolefin polymer powder containing active catalyst residues is deactivated by contacting such powder with a mixture containing an inert gas and an ammonium salt in a dry state.

BRIEF DESCRIPTION OF THE INVENTION

This invention is useful in deactivating residue from transition metal compound/organoaluminum catalysts in polyolefins. Polyolefins may be formed in a solution or a slurry in a suitable solvent or diluent, typically a liquid hydrocarbon such as hexane or heptane. Alternatively polymerization may occur in bulk liquid monomer, for example, liquid propylene, or may occur in the gas phase. It has been found that if a polyolefin such as polypropylene is formed in bulk or in vapor phase the amount of catalyst residue material left in the polymer is increased over the amount present in solution or slurry-phase products. Thus the invention disclosed herein is most suitable in bulk or vapor phase polymerization processes.

The method of this invention comprises contacting propylene polymer powder containing undeactivated catalyst residues with an ammonium salt such as ammonium bicarbonate or ammonium acetate in a fluid bed. The resultant propylene powder has a reduced level of chloride residues and corrosivity.

In more detail this invention is a method to deactivate a live propylene powder using an ammonium salt in a fluid bed. In this method polymer powder is fluidized in a suitable chamber using an inert gas, such as nitrogen, as a fluidizing gas. An ammonium salt is added in either batchwise or continuously such that the concentration of ammonium salt is about 0.05 to about 5 wt% of the fluidized solids. Preferably about 0.1 to about 1.0 wt.% ammonium salt is useful. The operating temperature of the fluidized bed can range from about 50° C. to about 5° C. below the softening point of the polymer and typically is about 95° to about 135° C. As the temperature increases the residence time in the fluidized bed can be shortened, however, a too high temperature can degrade the polymer. Contact time in the fluid bed typically can be about 10 to about 120 minutes and typically is about 30 to about 90 minutes. Although, typically, polymer powder is treated in this invention in a fluidized bed, other batch or continuous contact means can be used. The preferable deactivation method of this invention is in a dry state, that is, less than about 50 parts per million by weight (ppm) of water. Additional water can be present in the process, but is neither required nor desired.

Although ammonium bicarbonate and ammonium acetate are the preferred ammonium compounds useful in this invention, other ammonium salts can be used provided they are decomposed at the operating temperature ranges of the fluid bed.

The polyolefin most useful in this invention is propylene polymer, that is, propylene homopolymer and copolymers of propylene containing minor amounts of ethylene or other copolymerizable alpha-olefins. Other polyolefins typically are prepared by contacting an olefin monomer with a catalyst comprising a transition metal compound, such as a titanium compound, usually a titanium trihalide, and an aluminum alkyl. Other substances can be present in minor amounts as catalyst modifiers.

The catalyst useful in olefin polymerization system from which powder can be deactivated according to this invention contains (a) an organoaluminum compound and (b) a transition metal compound.

Useful organoaluminum compounds include trialkylaluminum, dialkylaluminum halides, mixtures of trialkylaluminum with dialkylaluminum halides and mixtures of trialkylaluminum with alkylaluminum dihalides. Also catalytic effective amounts of mixtures of trialkylaluminum and dialkylaluminum halides can be used in conjunction with alkylaluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable in propylene polymerizations.

The transition metal compounds useful as a component in the catalyst system of this invention are compounds of transition metals of Groups IVB, VB and VIB of the Periodic Table. Preferably, the transition metal compound is a halide of titanium, vanadium, chromium or zirconium. Most preferably, titanium trichloride and especially activated titanium trichloride is used for propylene polymerizations. Titanium trichloride can be activated to a high degree of polymerization activity by chemical and physical means. One activated titanium trichloride has an approximate stoichiometric formula of TiCl$_3$. ⅓ AlCl$_3$ and has been comminuted. Further, titanium trichloride can be activated by forming adducts with Lewis bases such as ethers or by supporting the titanium trichloride on a catalytically inert substance such as a metal oxide or salt. Examples of suitable titanium trichlorides are described in U.S. Pat. Nos. 3,984,350 and 4,210,738 both incorporated by reference herein.

The molar ratio of transition metal halide to organoaluminum compound in a catalyst system can range from about one-tenth to about 10, typically is about 1 to 3 and preferably is about 2. The amount of catalyst in a polymerization depends on the reactor size and type and on the amount and type of olefin monomer and is known to the skilled artisan.

Catalyst additives can be added in minor amounts such as disclosed in U.S. Pat. Nos. 3,950,268 and 4,072,809 both incorporated herein by reference.

Gas phase reactor systems include both stirred bed reactors and fluidized bed reactor systems. Examples of such reactor systems are described in U.S. Pat. Nos. 3,957,448, 3,965,083, 3,971,768, 3,970,611, 4,129,701, 4,101,289, 3,652,527, and 4,003,712 all incorporated by reference herein. Typical gas phase olefin polymerization reactor systems comprise a reactor vessel to which olefin monomer and catalyst components can be added and which contain a bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid can be added to polymerizing olefin in order to control temperature.

If polymer powder is produced in a bulk polymerization process, excess monomer should be removed, such as by flash drying, before deactivation according to this invention.

This invention is demonstrated, but not limited, by the following Examples.

EXAMPLES I-II

Samples of polypropylene powder produced by gas-phase polymerization containing active ("live") catalyst residues were deactivated in a bench-scale fluid bed apparatus comprising a vertical cylindrical chamber four inches in diameter and eight inches high equipped with a gas inlet at the bottom and a vent at the top. Nitrogen gas, at a metered flow rate, was passed through a heater, and then injected into the bottom of the fluid bed apparatus.

About 400 grams of live polypropylene powder together with 0.8 gram of an ammonium salt was charged batchwise to the fluid bed apparatus. The powder was fluidized and heated to 49° C. with dry, heated nitrogen containing about 1 ppm of water. The fluid bed was run for about 30 minutes at 45° C. and then heated and maintained at 129° C. for an additional 30 minutes. The results of two experiments using different ammonium salts are shown in the Table.

TABLE

| Ammonium Salt | Example I Ammonium Acetate | Example II Ammonium Bicarbonate |
|---|---|---|
| Chloride Level in Live Polymer (ppm) | 84 | 79 |
| Chloride Level in Deactivated Polymer (ppm) | 17 | 15 |
| Corrosivity Rating of Deactivated Polymer | 0 | 0 |

Chloride level is measured by the X-ray fluorescence method on injection molded polypropylene plaques in the presence of calcium stearate.

Corrosivity Rating is measured by placing a clean, dry steel test strip in a test tube surrounded by polypropylene powder and inserting the tube in a preheated aluminum block at 265°±5° C. for exactly 15 minutes. After the test strip has cooled polymer is removed and the strip is placed in a dessicator containing a saturated ammonium chloride solution for 16 hours. The resulting strip is rated for corrosivity on the basis:

0 = noncorrosive (no rusting or delustering)
1 = slightly corrosive (very light rusting, few small spots or slight delustering)
2 = corrosive (rust over most of the test area)
3 = very corrosive (heavy rust)

Polypropylene powder used in these experiments was produced in a gas-phase reactor system similar to that described in U.S. Pat. No. 3,965,083. A cylindrical reactor vessel of approximately 8 inches in diameter and 24 inches in length was equipped with three recycle gas nozzles spaced equidistantly along the bottom of the reactor and three liquid quench nozzles spaced equidistantly along the top of the reactor. The reactor was equipped with an off-gas port for recycling reactor gas through a condensor and back through a recycle gas line to the recycle gas nozzles in the reactor. During reactor operation polypropylene powder was produced in the reactor bed, flowed over a weir, and discharged through a powder discharge system into a secondary closed vessel blanketed with nitrogen. Powder was collected from the secondary vessel. Polymerization temperature and pressure were maintained at 160° F. and 300 psig respectively. Chemically activated titanium trichloride obtained from Solvay & Cie and diethylaluminum chloride in hexane solution were introduced into the reactor as catalyst components as two streams.

The examples show that contact of a "live" catalyst-containing polymer with an ammonium salt decreases the chloride level in the resulting polymer. Chloride level has been found to be a reasonable measure in estimating corrosivity in polypropylene. Thus the substantial decrease in chloride level in polymer deactivated according to this invention demonstrates the benefits of this invention.

We claim:

1. A method of deactivating a polyolefin powder containing active catalyst comprising contacting said polymer powder with an inert gas containing about 4 to about 10 wt.% based on the polymer of an ammonium salt selected from the group consisting of ammonium acetate and ammonium bicarbonate in a dry state for about 10 to about 90 minutes in a fluidized bed.

2. The method of claim 1 wherein the polyolefin is propylene homopolymer, or copolymers of propylene containing minor amounts of ethylene or copolymerizable alpha-olefin.

3. The method of claim 1 wherein the temperature is about 50° C. to about 5° C. below the softening point of the polymer.

4. The method of claim 3 wherein the concentration of the ammonium salt is about 0.05 to about 5 wt.% of the fluidized solids.

5. The method of claim 1 wherein the propylene homopolymer powder containing active catalyst is contacted with nitrogen containing about 0.1 to about 1.0 wt.% based on the polymer of an ammonium salt selected from the group consisting of ammonium bicarbonate and ammonium acetate for about 30 to about 90 minutes at about 95° to about 135° C. in a fluidized bed.

6. The method of claim 5 wherein the ammonium salt is ammonium bicarbonate.

7. The method of claim 6 wherein the ammonium salt is ammonium acetate.

* * * * *